(12) United States Patent
Oechsle et al.

(10) Patent No.: US 11,680,667 B2
(45) Date of Patent: Jun. 20, 2023

(54) BALL JOINT

(71) Applicant: Neoperl GmbH, Mullheim (DE)

(72) Inventors: Daniel Oechsle, Mullheim (DE); Holger Reinhardt, Buchheim (DE)

(73) Assignee: Neoperl GmbH, Müllheim (DE)

( * ) Notice: Subject to any disclaimer, the term of this patent is extended or adjusted under 35 U.S.C. 154(b) by 0 days.

(21) Appl. No.: 16/958,846

(22) PCT Filed: Dec. 18, 2018

(86) PCT No.: PCT/EP2018/085493
§ 371 (c)(1),
(2) Date: Jun. 29, 2020

(87) PCT Pub. No.: WO2019/166120
PCT Pub. Date: Sep. 6, 2019

(65) Prior Publication Data
US 2021/0071789 A1    Mar. 11, 2021

(30) Foreign Application Priority Data

Feb. 28, 2018 (DE) .......................... 202018101119.7

(51) Int. Cl.
*F16L 27/06* (2006.01)
(52) U.S. Cl.
CPC ................... *F16L 27/06* (2013.01)
(58) Field of Classification Search
CPC . F16L 27/06; F16L 37/52; F16L 27/04; E03C 2001/0414; E03C 2001/0415; E03C 1/084
See application file for complete search history.

(56) References Cited

U.S. PATENT DOCUMENTS

| | | | |
|---|---|---|---|
| 2,971,701 A | 2/1961 | Shames et al. | |
| 5,149,146 A * | 9/1992 | Simoni | B05B 15/654 285/146.1 |
| 8,746,596 B2 | 6/2014 | Grether et al. | |
| 2005/0156062 A1 | 7/2005 | Thomas et al. | |

(Continued)

FOREIGN PATENT DOCUMENTS

| CN | 2570584 | 9/2004 |
|---|---|---|
| CN | 204628889 | 9/2015 |

(Continued)

*Primary Examiner* — James M Hewitt, II
(74) *Attorney, Agent, or Firm* — Volpe Koenig

(57) ABSTRACT

A ball joint having first and second articulated coupling parts having interconnected liquid ducts. The second coupling part is held pivotably by a spherical front end region between a shape-adapted joint socket on the first coupling part and a joint head on a holding element in the inner cavity of the second coupling part. The holding element interconnects the liquid ducts, and the second coupling part has, on its inner wall delimiting the inner cavity, an annular groove with a ring seal. A first annular shoulder is on the inner wall of the second coupling part, an annular insert part is insertable into the inner cavity of the second coupling part, and the insert part is spaced apart from the first annular shoulder such that the spacing between the first annular shoulder and the front edge of the insert part facing the first annular shoulder forms the annular groove.

9 Claims, 2 Drawing Sheets

(56) References Cited

U.S. PATENT DOCUMENTS

| | | | |
|---|---|---|---|
| 2005/0186022 A1* | 8/2005 | Garraffa | B63C 11/2227 403/52 |
| 2007/0046023 A1* | 3/2007 | Hung | F16L 27/047 285/261 |
| 2009/0049600 A1 | 2/2009 | Weis | |
| 2018/0187807 A1 | 7/2018 | Reinhdt | |

FOREIGN PATENT DOCUMENTS

| | | |
|---|---|---|
| DE | 102004018749 | 11/2005 |
| DE | 102006013803 | 9/2007 |
| DE | 202006018395 | 5/2008 |
| DE | 202014006031 | 12/2015 |
| DE | 102016106908 | 10/2017 |
| WO | 2011157311 | 12/2011 |

* cited by examiner

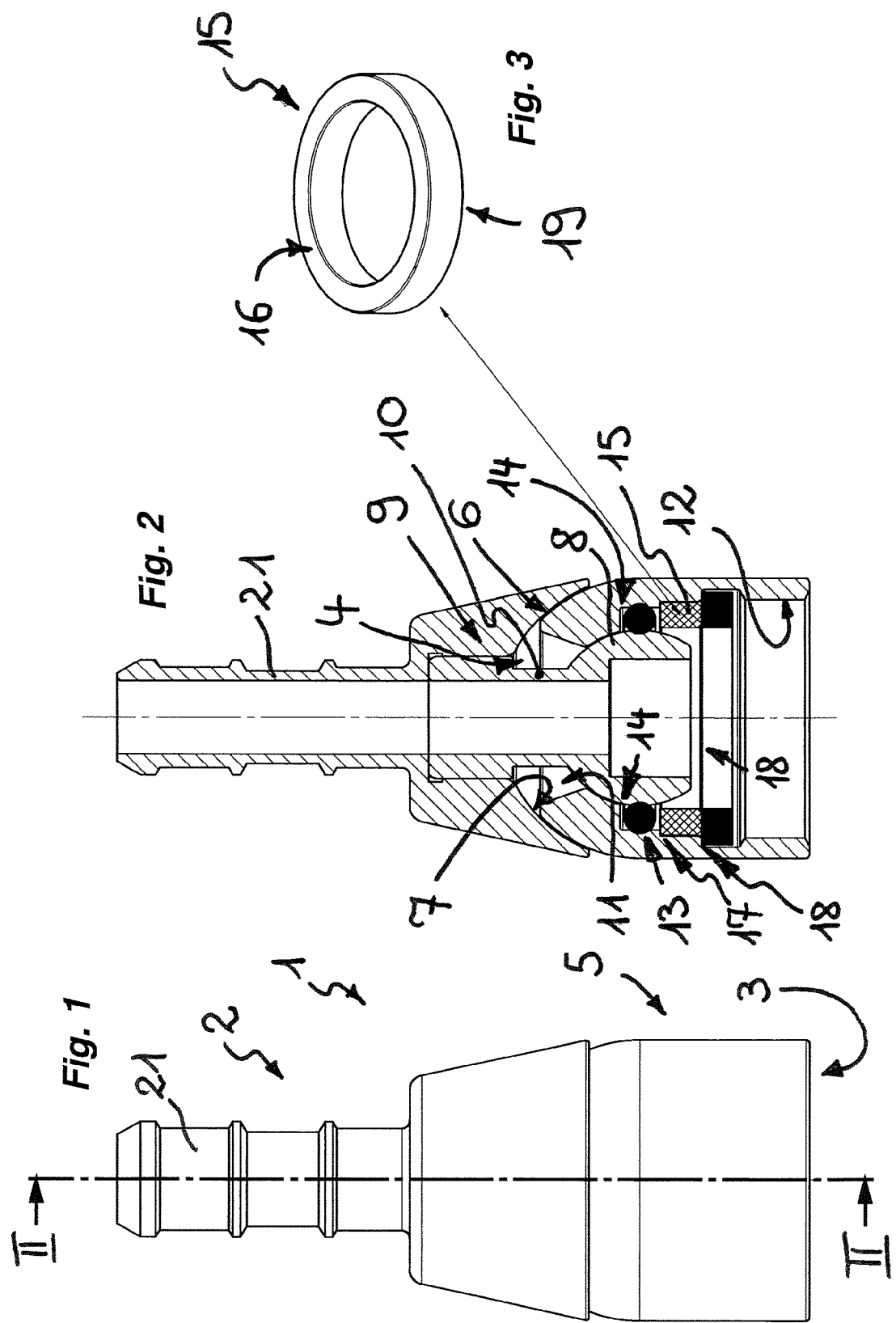

BALL JOINT

TECHNICAL FIELD

The invention relates to a ball joint with a first coupling part, which can be fastened to a sanitary water line, and a second coupling part, which is connected in an articulated manner to said first coupling part, which have liquid channels connected to one another, wherein the second coupling part is held pivotably by a spherical face end region, in the form of a spherical cap or segment of a sphere or the like, of its wall between a form-adapted joint socket on the first coupling part, on the one hand, and a joint head on a holding element provided in the inner cavity of the second coupling part, on the other hand, wherein the holding element passes through a push-through opening of the second coupling part by means of a connecting shaft engaging on the first coupling part and connects the liquid channels of the first coupling part and of the second coupling part to one another, and wherein the second coupling part has, on its inner wall bounding the inner cavity, an annular groove in which is provided an annular seal, which provides a seal between the second coupling part and the holding element.

BACKGROUND

A ball joint of the type mentioned at the beginning is already previously known from DE 20 2006 018 395 U1. The previously known ball joint, which can be releasably fastened to a water outlet of a sanitary outlet fitting by its first coupling part, has mounted pivotably in the first coupling part a second coupling part, into the inner cavity of which an insert cartridge, in the form of a jet regulator for example, can be inserted from the outflow-side face end of the second coupling part. In this case, the first coupling part and the second coupling part are produced from metal by machining. In the context of the production steps required, the annular groove required for placing an annular seal must also be incorporated into the inner circumferential wall, bounding the inner cavity, of the second coupling part. The chips produced during the machining can become lodged in this annular groove. These chips must subsequently be removed by comprehensively cleaning these machined components. However, chips can become lodged in particular in the corner regions of this annular groove, which subsequently lead to leakages in the region of the annular seal when the previously known ball joint is being used.

SUMMARY

The object is therefore to provide a ball joint of the type mentioned at the beginning, the production of which is associated with a reduced outlay and which nevertheless ensures increased functional reliability.

This object is achieved, according to the invention, in the case of the ball joint of the type mentioned at the beginning in particular by providing a first annular shoulder on the inner wall of the second coupling part, by an insert part that is annular or in the form of a sleeve being insertable into the inner cavity of the second coupling part, which insert part is held on the inner wall of the second coupling part, and by the insert part being spaced apart from the first annular shoulder such that the spacing between the first annular shoulder and that face edge of the insert part which faces the first annular shoulder forms the annular groove.

The ball joint according to the invention has a first coupling part, by which the ball joint can be fastened to a sanitary water line. The ball joint according to the invention also has a second coupling part, which is connected in an articulated manner to the first coupling part. The first coupling part and the second coupling part have liquid channels which are connected to one another. In this case, the second coupling part is held pivotably by a spherical face end region, in the form of a spherical cap or segment of a sphere or the like, of its wall between a form-adapted joint socket on the first coupling part, on the one hand, and a joint head, which joint head is arranged on a holding element provided in the inner cavity of the second coupling part. The holding element has a connecting shaft, which engages on the first coupling part and by means of which the holding element passes through a push-through opening of the second coupling part. The holding element connects the liquid channels of the first coupling part and of the second coupling part to one another. The second coupling part has, on its inner wall bounding the inner cavity, an annular groove in which an annular seal is provided, which provides a seal between the second coupling part and the holding element. In this regard, a first annular shoulder is provided on the inner wall of the second coupling part and an insert part that is annular or in the form of a sleeve can be inserted into the inner cavity of the second coupling part. This insert part is held on the inner wall of the second coupling part and is spaced apart from the first annular shoulder such that the spacing between the first annular shoulder and that face edge of the insert part which faces the first annular shoulder forms the annular groove. The annular groove thus no longer has to be incorporated by machining into the second coupling part of the ball joint according to the invention. Rather, this annular groove is formed between the first annular shoulder and the insert part, which can be inserted into the inner cavity of the second coupling part. Since an annular groove, in which the chips formed by the machining of the second coupling part may stubbornly become lodged, no longer has to be incorporated into the inner cavity of the second coupling part, this is conducive to high functional reliability of the ball joint, even if a complex cleaning of the second coupling part is dispensed with.

The insert part may be held in the inner cavity of the second coupling part for example by way of a screw connection. By contrast, a particularly simple and nevertheless sufficiently secure fastening of the insert part provides that the insert part is held in a form fit and/or frictional engagement on the inner wall of the second coupling part.

In order to provide a sufficiently wide annular groove for the annular seal and, on the other hand, to establish the spacing between the first annular shoulder and the end face, which faces it, of the insert part that is annular or in the form of a sleeve, it is advantageous when the insert part can be inserted into the inner cavity of the second coupling part as far as a second annular shoulder.

A particularly advantageous embodiment according to the invention, in which possible leakage flows can be counteracted effectively, provides that the insert part extends between the second annular shoulder and a third annular shoulder, and that the third annular shoulder and the adjacent face edge of the insert part are arranged in a plane.

If the third annular shoulder and the adjacent face edge of the insert part are arranged in a plane, a sealing ring can be placed closely against the third annular shoulder and the adjacent face edge of the insert part.

In order to be able to form well and/or adjust the water flowing through the ball joint according to the invention, it is advantageous when a sanitary insert cartridge can be inserted into the inner cavity of the second coupling part from that face opening of the second coupling part which faces away from the first coupling part.

Another advantageous example of use according to the invention provides that a handheld shower attachment is preferably releasably held on the first coupling part or the second coupling part and a flexible hose line is preferably releasably held on the other coupling part respectively.

A leakage of the ball joint according to the invention can be avoided particularly simply when the sanitary insert cartridge bears against that face edge of the sealing ring which faces away from the insert part or when an adjacent face edge of an angle valve or of a handheld shower attachment bears against the face edge which faces away from the insert part.

An internal or external thread which can be fastened to the mating thread on the water outlet of a sanitary outlet fitting may be provided on that face end region of the first coupling part which faces away from the second coupling part.

By contrast, a preferred embodiment according to the invention provides that the first coupling part is in the form of a hose connector in its end region which faces away from the second coupling part or has a hose connector, onto which hose connector a hose end of a partial region, in the form of a flexible hose line, of the water line can be pushed.

It is even more conducive to the simple producibility of the ball joint according to the invention when the insert part that is annular or in the form of a sleeve is produced from plastic.

In order to also be able to conduct hot and in particular boiling-hot liquids, as required, through the ball joint according to the invention, it can be advantageous when the insert part that is annular or in the form of a sleeve is produced from a heat-resistant and in particular a boiling-resistant material, preferably from metal.

BRIEF DESCRIPTION OF THE DRAWINGS

Developments according to the invention emerge from the following description of a preferred exemplary embodiment in conjunction with the claims and the drawing. The invention is described in more detail below with reference to a preferred exemplary embodiment.

In the figures:

FIG. 1 shows a ball joint represented in a side view, which has a first coupling part on which a second coupling part is held pivotably, FIG. 2 shows the ball joint shown in FIG. 1 in a longitudinal section through the sectional plane II-II from FIG. 1, where it can be seen in this longitudinal section that the second coupling part of the ball joint has an inner cavity, and that in the inner wall, bounding the inner cavity, of the second coupling part an annular groove is provided, which is formed between a first annular shoulder provided in the inner wall and the adjacent end face of an insert part inserted into the inner cavity, FIG. 3 shows the insert part, intended for inserting into the inner cavity of the second coupling part, of the ball joint shown in FIGS. 1 and 2 in a perspective side view.

DETAILED DESCRIPTION

Figure 4:
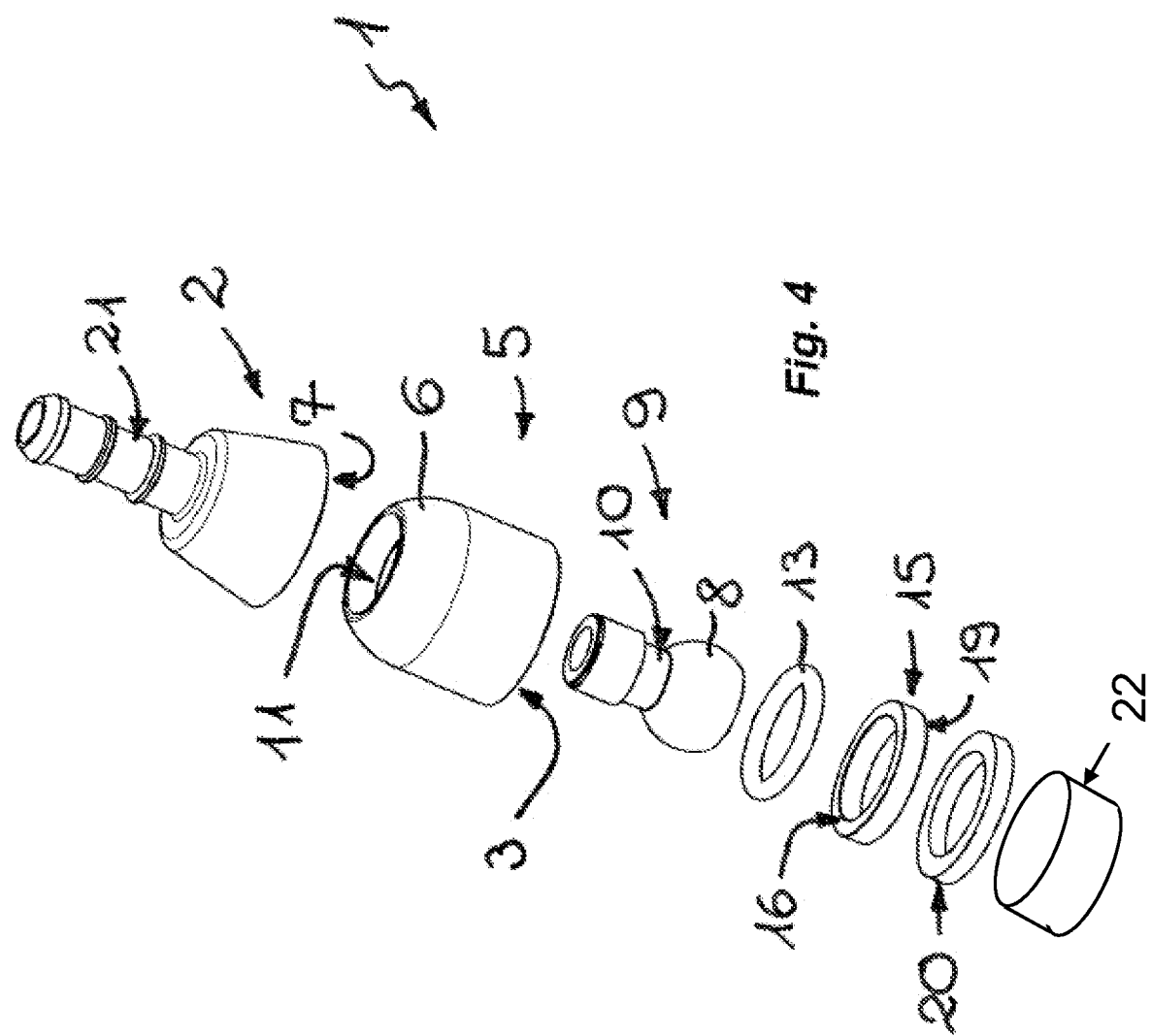
FIG. 4 shows the ball joint in a pulled-apart perspective representation of its constituent parts.

FIGS. 1, 2 and 4 represent various views of a ball joint 1. The ball joint 1 has a first coupling part 2, which can be connected to a sanitary water line. In this regard, the first coupling part 2 of the ball joint 1 is connected in an articulated manner to a second coupling part 5, wherein the first coupling part 2 and the second coupling part 5 have liquid channels which are connected to one another.

The second coupling part 5 of the ball joint 1 represented here is held pivotably by a spherical face end region 6 of its wall between a form-adapted joint socket 7 on the first coupling part 2, on the one hand, and a joint head 8 on a holding element 9 provided in the inner cavity 4 of the second coupling part 5, on the other hand. The holding element 9 passes through a push-through opening 11 of the second coupling part 5 by means of a connecting shaft 10 engaging on the first coupling part 2. The holding element 9 connects the liquid channels of the first coupling part 2 and of the second coupling part 5 to one another.

It can be seen in FIGS. 1, 2 and 4 that the holding element 9 is substantially in the form of a sleeve. The ball joint 1 may have on its second coupling part 5 an outflow-side insertion opening 3, through which an insert cartridge can be inserted into the inner cavity 4 of the second coupling part 5. In the case of the exemplary embodiment represented here, the second coupling part 5 has a thread 12, which can be screwed on the mating thread of an angle valve on the wall side.

It is clear from a comparison of FIGS. 1, 2 and 4 that the second coupling part 5 has, on its inner wall bounding the inner cavity 4, an annular groove, in which is provided an annular seal 13, which provides a seal between the second coupling part 5 and the holding element 9. In this regard, a first annular shoulder 14, which forms the annular groove for the annular seal 13 at a spacing between said annular shoulder and the adjacent face edge 16 of an insert part 15, is provided on the inner wall of the second coupling part 5. In this regard, the insert part 15 can be inserted into the inner cavity 4 of the second coupling part 5 as far as a point at which the insert part 15 bears against a second annular shoulder 17 in the inner cavity 4. The insert part 15 is held, preferably in a frictional engagement and in particular by a press fit, on the inner wall of the second coupling part 5. As is clear from the longitudinal section in FIG. 2, the insert part 15 extends between the second annular shoulder 17 and a third annular shoulder 28, which third annular shoulder 18 is arranged in a plane with the adjacent face edge 19 of the insert part 15. A sealing ring 20 bears against the third annular shoulder 18 and the adjacent face edge 19 of the insert part 15.

As is clear from a comparison of FIGS. 1, 2 and 4, the first coupling part 2 is in the form of a hose connector 21 in its end region, which faces away from the second coupling part 5, onto which hose connector 21 a hose end of a partial region, in the form of a flexible hose line, of the water line can be pushed. While the second coupling part 5 and the first coupling part 2 are preferably produced from metal, by contrast the insert part 15 that is annular or in the form of a sleeve is manufactured from plastic.

As shown in FIG. 4, a sanitary insert cartridge 22 (shown schematically) can be inserted into the inner cavity of the second coupling part 5 from that face opening 3 of the second coupling part 5 which faces away from the first coupling part 2. The sanitary insert cartridge 22 can bear against the face edge 19 of the sealing ring 20 which faces away from the insert part 15.

LIST OF REFERENCE SIGNS

1 Ball joint
2 First coupling part
3 Insertion opening

4 Inner cavity
5 Second coupling part
6 Spherical face end region of the second coupling part (5)
7 Joint socket
8 Joint head
9 Holding element
10 Connecting shaft
11 Push-through opening on the second coupling part (5)
12 Thread on the second coupling part
13 Annular seal
14 First annular shoulder
15 Insert part
16 Face edge
17 Second annular shoulder
18 Third annular shoulder
19 Face edge
20 Sealing ring
21 Hose connector
22 sanitary insert cartridge

The invention claimed is:

1. A ball joint (1), comprising
a first coupling part (2), configured to be fastened to a sanitary water line,
a second coupling part (5) connected in an articulated manner to said first coupling part, said first and second coupling parts including liquid channels connected to one another,
a holding element (9) provided in an inner cavity (4) of the second coupling part (5), the second coupling part (5) is held pivotably by a spherical face end region (6) thereof, configured as a spherical cap or segment of a sphere between a form-adapted joint socket (7) configured as a complementary concave spherical segment on the first coupling part (2) and a joint head (8) on the holding element (9) provided in the inner cavity (4) of the second coupling part (5),
the holding element (9) including a connecting shaft (10) that passes through a push-through opening (11) of the second coupling part (5) and engaging on the first coupling part (2) and connects the liquid channels of the first coupling part (2) and of the second coupling part (5) to one another,
an annular groove located on an inner wall bounding the inner cavity (4) of the second coupling part (5),
an annular seal (13) which provides a seal between the second coupling part (5) and the holding element (9) located in the annular groove,
a first annular shoulder (14) is provided on the inner wall of the second coupling part (5),
an insert part (15) that is annular or sleeve-shaped is insertable into the inner cavity (4) of the second coupling part (5), the insert part (15) is held on the inner wall of the second coupling part (5),
the insert part (15) is spaced apart from the first annular shoulder (14) such that a spacing between the first annular shoulder (14) and a face edge (16) of the insert part (15) which faces the first annular shoulder (14) forms the annular groove,
wherein the insert part (15) is insertable into the inner cavity (4) of the second coupling part (5) as far as a stop formed by a second annular shoulder (17) provided on the inner wall of the second coupling part (5), and
wherein the insert part (15) extends between the second annular shoulder (17) and a third annular shoulder (18), and the third annular shoulder (18) and an adjacent face edge (19) of the insert part (15) are arranged in a common plane.

2. The ball joint as claimed in claim 1, wherein the insert part (15) is held with at least one of a form fit or frictional engagement on the inner wall of the second coupling part (5).

3. The ball joint as claimed in claim 1, further comprising a sealing ring (20) that bears against the third annular shoulder (18) and the adjacent face edge (19) of the insert part (15).

4. The ball joint as claimed in claim 3, further comprising a sanitary insert cartridge inserted into the inner cavity from that face opening (3) of the second coupling part (5) which faces away from the first coupling part (2).

5. The ball joint as claimed in claim 4, wherein the sanitary insert cartridge bears against the face edge (19) of the sealing ring (20) which faces away from the insert part (15).

6. An assembly comprising the ball joint as claimed in claim 1, a handheld shower attachment releasably held on the first coupling part (2) or the second coupling part (5), and a flexible hose line held on the other of the first coupling part or the second coupling part respectively (5; 2).

7. The ball joint as claimed in claim 1, wherein the first coupling part (2) is configured as a hose connector (21) in an end region thereof, which faces away from the second coupling part (5), onto which hose connector (21) a hose end of a partial of the water line is pushable.

8. The ball joint as claimed in claim 1, wherein the insert part (15) that is annular or sleeve-shaped is produced from plastic.

9. The ball joint as claimed in claim 1, wherein the insert part (15) that is annular or sleeve-shaped is produced from a heat-resistant material.

* * * * *